United States Patent Office 2,934,174
Patented Apr. 26, 1960

2,934,174
MULTI-DISC BRAKE

René Lucien, Neuilly-sur-Seine, France, assignor to Societe a responsabilite limitee: Recherches Etudes Production R.E.P., Paris, France, a corporation of France Application November 21, 1957, Serial No. 697,949

Claims priority, application France July 9, 1957

2 Claims. (Cl. 188—73)

This invention relates to brakes.

It is well known that disc-brakes comprising a number of discs offer the advantage, as compared with single-disc brakes, of a greater braking power with a small increase in overall size. Known multiple-disc brakes have, however, the following disadvantage: an accidental distortion of the disc, even small, results in an irregular braking action together with inadmissible stresses in the brake members, and it has not been possible up to now to find a remedy for this drawback as was possible in the case of single-disc brakes.

The invention has for an object the provision of a brake with a number of discs which brake does not have the above drawback, and which is provided in addition with a system for taking-up wear in the brake linings, this resulting in a brake of great durability and having minimum requirements with respect of maintenance.

In the accompanying drawings, which show one embodiment of the invention, given by way of example only and without implied limitation:

A brake provided in accordance with the invention is shown mounted for braking a wheel supported on a rim 1 and a hub 2, and rotating about a shaft 3.

Figure 3:
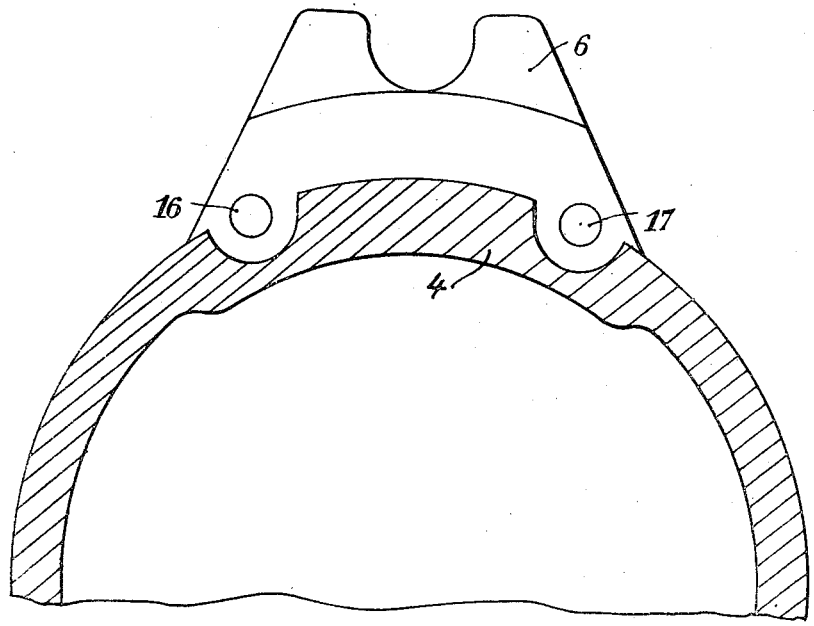
Fig. 3 is a transverse cross-section of the member 4 along line 3—3 shown in Fig. 1.

The brake comprises a massive fixed member 4, of which one of the extremities 5 forms a brake cylinder while the other extremity is bent back towards the exterior and terminates in a fork 6 (Fig. 3). This fork 6 is provided so as to enable a machining of the brake cylinder readily by passing a tool through the slot of the fork. The member 4 is subjected to the braking stresses, and the fact that it is solid results in that it is only slightly deformable for a relatively low weight.

In the embodiment shown, the discs of the brake are two in number and are indicated by the references 7 and 8. They are rigidly fixed for rotation with the rim of the wheel, but can make with respect to the rim, longitudinal movements by virtue of longitudinal splines formed on the inside of the said rim, and because their circumferences are provided with teeth adapted to co-operate with these splines. This device is well known per se and has therefore not been shown in detail in the drawings.

The brake linings which co-operate with the discs 7 and 8 are four in number. The first, lining 9, is rigidly fixed to a lining-carrier 10; it co-operates so as to grip the disc 7 with a second lining 11 carried by an intermediate lining-carrier 12, which carries on its other face a lining 13 for gripping the disc 8 in co-operation with a further lining 14 carried by a lining-carrier 15.

The lining-carriers 10, 12 and 15 can slide longitudinally along guides 16 and 17 about which, in addition, they have a certain play.

Inside the cylinder 5 is arranged a hydraulic jack with a device for taking-up play which will be described below. During braking, the piston of this jack pushes the lining-carrier 10 towards the right, thus effecting the clamping action of each lining against its disc, by virtue of the fact that each of its parts has a degree of longitudinal freedom.

Figure 1:
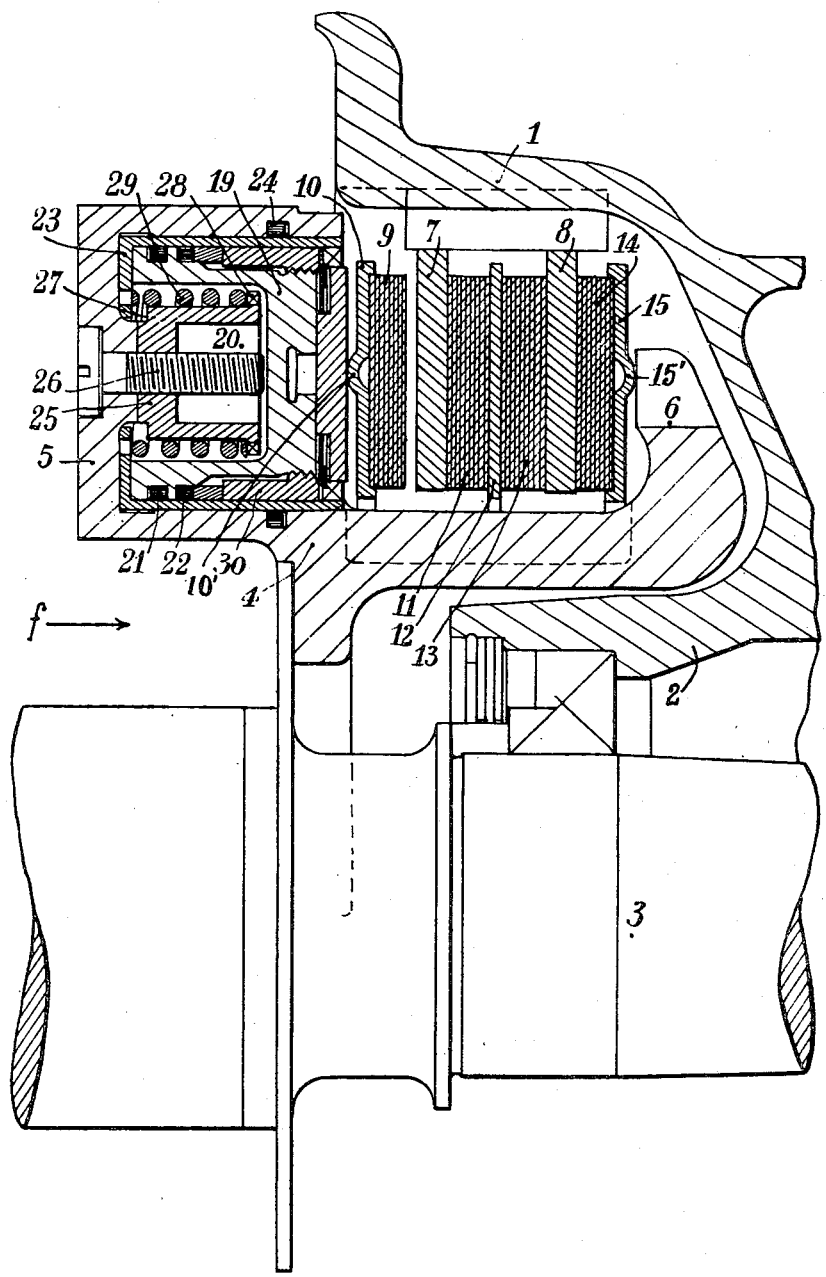
Fig. 1 is a cross-section along the axis of a wheel provided with a brake in accordance with the invention, only the upper half-section of the wheel being shown.
Figure 2:
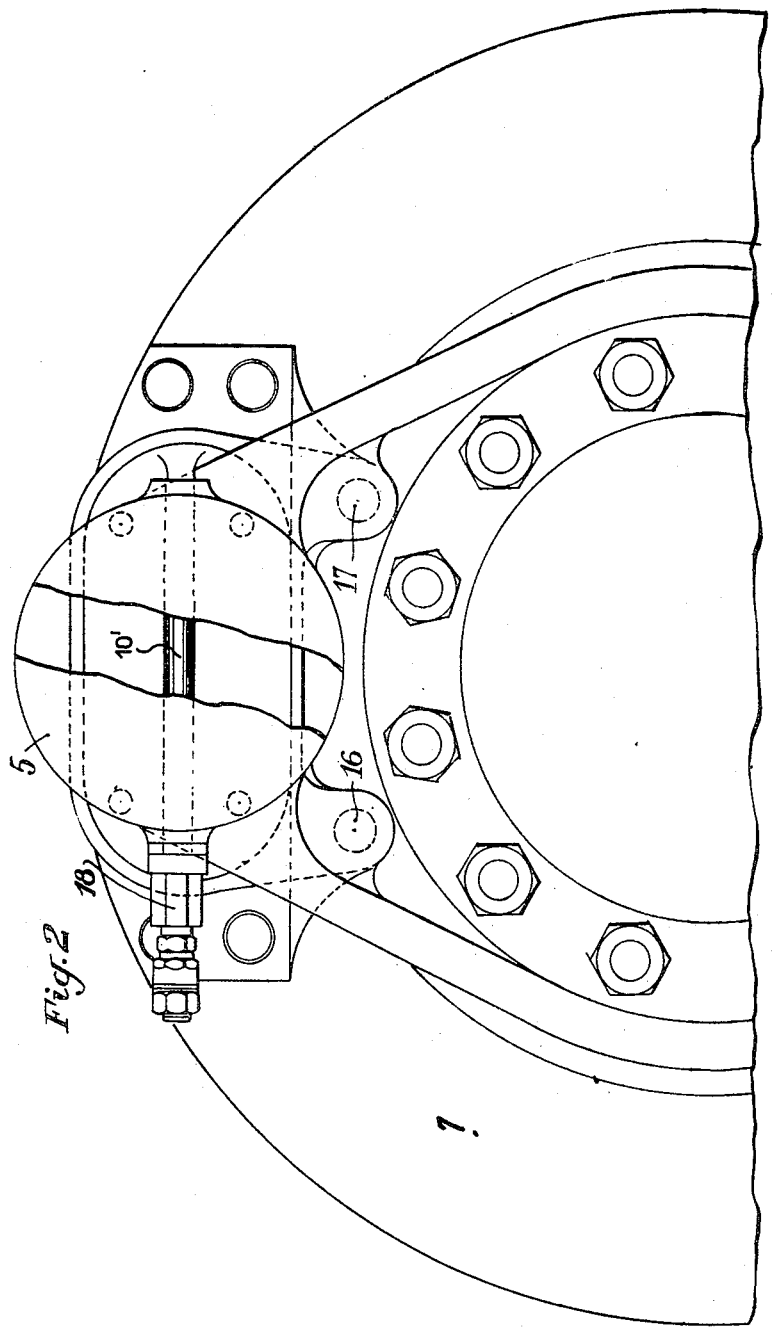
Fig. 2 is an end view of the wheel and the brake looking in the direction of the arrow f.
Figure 4:
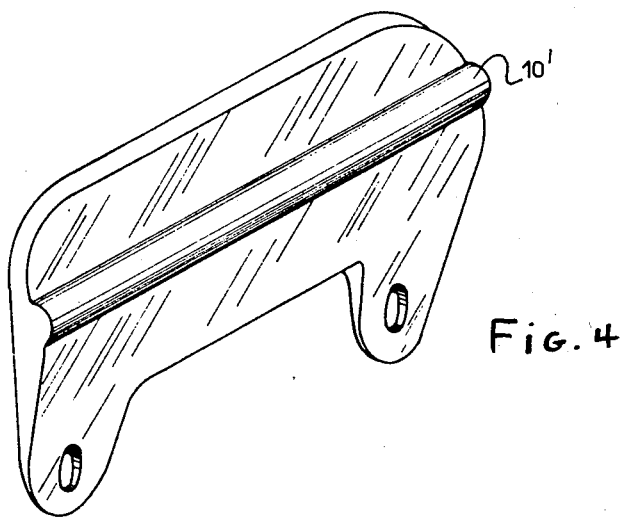
Figs. 4 and 5 are perspective views of details of the structure of Fig. 1.
Figure 5:
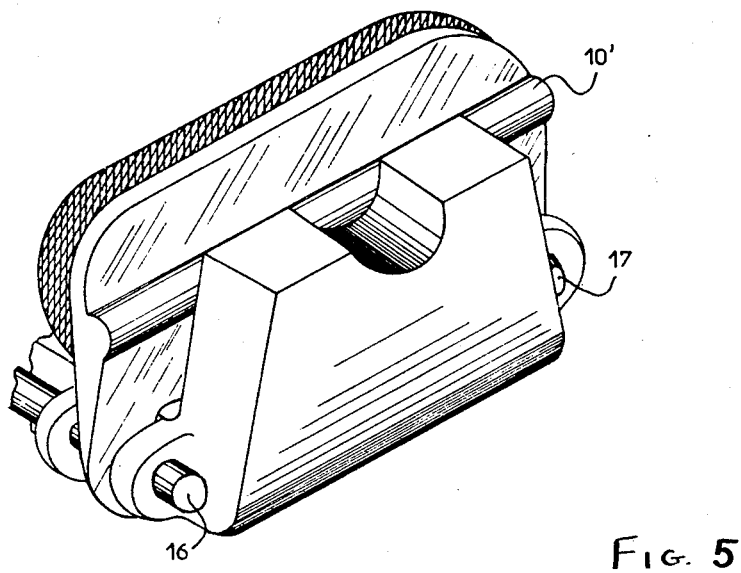

In accordance with the invention and as particularly illustrated in Figs. 4 and 5, the outer lining carriers 10 and 15 are respectively provided with a straight semi-cylindrical boss 10' and 15' (at right angles to the plane of Fig. 1) so as to co-operate respectively with the piston of the jack and the fork 6. The opposite clamping forces are thus each applied along a single line at the center of the lining-carriers and, due to the fact that these carriers have a certain play on their guides 16, 17, the linings bear on the discs in a uniform manner, even if these are slightly offcenter or buckled.

The jack with which the brake is provided has the following particular features: it comprises an intake conduit 18 for its cylinder 5. The piston 19 of the jack is provided with a cavity and, by means of two friction linings 21 and 22, it can slide with a substantial degree of friction inside a jacket 23, which can itself slide to a certain depth inside the cylinder 5, by virtue of a fluid-tight packing 24 which offers very little friction. To the bottom of the cylinder is rigidly fixed an internal member 25 housed in the cavity 20 of the piston. This member is fixed to the inside of the cylinder, for example, by means of a screw 26, and is provided with two annular shoulders 27 and 28, the first serving as an abutment for the moving jacket 23, and the second as a support for a helicoidal spring 29 which is supported at its other extremity against the bottom of the said moving jacket. In addition, an annular ring 30 is screwed on the piston 19 so as to permit an adjustment of the clamping action of the friction lining 22, and in consequence of the amount of friction between the piston 19 and the jacket 23.

The operation of this assembly is as follows: the adjustment is such that the pressure of the spring 29 to which is added the friction force of the fluid-tight packing 24 remains less than the friction force of the linings 21 and 22. In consequence, when fluid under pressure is sent into the cylinder, the jacket 23 and the piston 19 are first of all moved together towards the right, against the action of the spring 29. When the bottom of the jacket comes into abutment against the shoulder 27, it is stopped and the piston continues to move toward the right-hand side of Fig. 1, against the friction of the linings 21 and 22, so as to effect the braking required. When the hydraulic pressure is removed, the jacket 23 moves back under the action of the spring 29, and by virtue of the high friction due to the linings 21 and 22, it brings back with it the piston 19 over a distance equal to the initial distance between the bottom of the jacket and the shoulder 27. This length thus constitutes a constant play under which the brake operates, whatever may be the condition of wear of its brake-linings.

As compared with the previously proposed systems for taking up play, the system in accordance with the invention has the advantage of much greater compactness because the spring is located in the inside of the piston. In addition, it has the superior feature of provision of an adjustment of the friction between the piston of the jack and the play-limiting member, which in the present case is the jacket 23.

What I claim is:

1. A brake comprising a plurality of disc members, a plurality of friction lining members interposed between said disc members, clamping means including a fixed section and a hydraulic jack movable with respect to said fixed section, said disc and friction lining members being positioned between the jack and fixed section, and pressure transmission devices between said members and said fixed section and jack respectively and including bosses with semi-circular cross-sections for engagement by the jack and fixed section, the bosses having rectilinear generatrices and engaging the fixed section and jack along the entire lengths of their respective generatrices, said discs having respective radii perpendicular to said generatrices.

2. A brake as claimed in claim 1 wherein the pressure transmission devices are lining member carriers each supporting a friction lining member.

References Cited in the file of this patent

UNITED STATES PATENTS

| | | |
|---|---|---|
| 1,754,764 | Olson | Apr. 15, 1930 |
| 2,002,900 | White | May 28, 1935 |
| 2,048,420 | Babel | July 21, 1936 |
| 2,655,230 | Buyze | Oct. 13, 1953 |
| 2,667,947 | Lucien | Feb. 2, 1954 |
| 2,720,286 | Bricker | Oct. 11, 1955 |
| 2,746,254 | Lucien | May 22, 1956 |
| 2,768,710 | Butler | Oct. 30, 1956 |
| 2,817,419 | Wolf | Dec. 24, 1957 |

FOREIGN PATENTS

| | | |
|---|---|---|
| 695,237 | France | Dec. 12, 1930 |
| 648,819 | Great Britain | Jan. 10, 1951 |